United States Patent
Morinaga (10) Patent No.: US 11,545,681 B2
(45) Date of Patent: Jan. 3, 2023

(54) FUEL CELL SYSTEM

(71) Applicant: TOYOTA JIDOSHA KABUSHIKI KAISHA, Toyota (JP)

(72) Inventor: Rei Morinaga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 95 days.

(21) Appl. No.: 17/078,216

(22) Filed: Oct. 23, 2020

(65) Prior Publication Data

US 2021/0194023 A1 Jun. 24, 2021

(30) Foreign Application Priority Data

Dec. 23, 2019 (JP) .............................. JP2019-232029

(51) Int. Cl.
| | |
|---|---|
| *H01M 8/04082* | (2016.01) |
| *H01M 8/04537* | (2016.01) |
| *H01M 8/04746* | (2016.01) |
| *H01M 8/04111* | (2016.01) |

(52) U.S. Cl.
CPC .... *H01M 8/04201* (2013.01); *H01M 8/04111* (2013.01); *H01M 8/04559* (2013.01); *H01M 8/04753* (2013.01); *H01M 2250/20* (2013.01)

(58) Field of Classification Search
CPC ......... H01M 8/04029; H01M 8/04097; H01M 8/04111; H01M 8/04164; H01M 8/04201; H01M 8/04559; H01M 8/04619; H01M 8/04753; H01M 8/04768; H01M 16/006; H01M 2250/20
See application file for complete search history.

(56) References Cited

U.S. PATENT DOCUMENTS

| | | | | |
|---|---|---|---|---|
| 2005/0186454 | A1* | 8/2005 | Clingerman | ...... H01M 8/04225 |
| | | | | 429/432 |
| 2005/0221146 | A1* | 10/2005 | Horiguchi | ......... H01M 8/04067 |
| | | | | 429/456 |
| 2015/0288009 | A1* | 10/2015 | Manabe | .................... F02C 3/04 |
| | | | | 429/446 |

FOREIGN PATENT DOCUMENTS

| | | |
|---|---|---|
| JP | 2005-259692 A | 9/2005 |
| JP | 2007-299691 A | 11/2007 |
| JP | 2010-244937 A | 10/2010 |
| JP | 2019-079757 A | 5/2019 |

* cited by examiner

*Primary Examiner* — Stewart A Fraser
*Assistant Examiner* — Brent C Thomas
(74) *Attorney, Agent, or Firm* — Finnegan, Henderson, Farabow, Garrett & Dunner, LLP (57) ABSTRACT

A fuel cell system includes a fuel cell stack, a first discharger, an opening-and-closing valve, a second discharger, a voltage detector, and a controller.

11 Claims, 10 Drawing Sheets

FUEL CELL SYSTEM

CROSS-REFERENCE TO RELATED APPLICATION

This application is based upon and claims the benefit of priority of the prior Japanese Patent Application No. 2019-232029, filed on Dec. 23, 2019, the entire contents of which are incorporated herein by reference.

TECHNICAL FIELD

The present disclosure relates to a fuel cell system.

BACKGROUND

There is known an intermittent operation in which power generation of a fuel cell stack is temporarily stopped by using power of a secondary battery when required power to a fuel cell stack is equal to or lower than a predetermined power. In the intermittent operation, oxidant gas is supplied to the fuel cell stack so that a voltage of the fuel cell stack does not exceed a range between a predetermined upper limit voltage and lower limit voltage. In supplying the oxidant gas to the fuel cell stack, there is known a compressor and a blower selectively used according to the required power to the fuel cell stack and provided in a gas flow path through which the oxidant gas flows (See, for example, Japanese Unexamined Patent Application Publication No. 2005-259692).

In the supply amount of the oxidant gas supplied to the fuel cell stack, the power generation operation in which the fuel cell stack generates power differs from the intermittent operation in which the power generation is temporarily stopped. Since a large amount of the oxidant gas is consumed in the fuel cell stack in the power generation operation, a discharger having a large discharge pressure may be used. On the other hand, in the intermittent operation, a discharger having a small discharge pressure may be used in order to reduce power consumption.

In Japanese Unexamined Patent Application Publication No. 2005-259692, a compressor and a blower are used as two dischargers having different discharge pressures, and a bypass flow path bypassing the blower is provided, and a bypass valve is provided in the bypass flow path. With the provision of the bypass flow path, the oxidant gas sucked and discharged by the compressor is suppressed from flowing through the blower, and flows through the bypass flow path, so that the oxidant gas is efficiently supplied. With the provision of the bypass valve in the bypass passage, the oxidant gas discharged from the blower is suppressed from flowing backward to the bypass flow path, so that the oxidant gas is efficiently supplied. However, the provision of the bypass flow path increases the size of the fuel cell system.

SUMMARY

It is therefore an object of the present disclosure to efficiently supply an oxidant gas in accordance with a power generation state of a fuel cell stack and to suppress an increase in size of a fuel cell system.

The above object is achieved by a fuel cell system including: a fuel cell stack; a first discharger configured to suck oxidant gas and to discharge the oxidant gas toward the fuel cell stack, and provided within an oxidant gas flow path supplying the oxidant gas to the fuel cell stack; an opening-and-closing valve provided within the oxidant gas flow path, and configured to open and close a partial area of the oxidant gas flow path next to the first discharger, the opening-and-closing valve and the first discharger being arranged side by side in a direction intersecting a flow of the oxidant gas; a second discharger provided at an upstream side or a downstream side of the flow of the oxidant gas with respect to the first discharger and the opening-and-closing valve, and configured to suck the oxidant gas through the oxidant gas flow path and to discharge the oxidant gas toward the fuel cell stack through the oxidant gas flow path, a discharge pressure of the second discharger being higher than a discharger pressure of the first discharger; a voltage detector configured to detect a voltage of the fuel cell stack; and a controller configured to control the first discharger and the second discharger, wherein the controller is configured to drive the second discharger in a state where the opening-and-closing valve opens, in a power generation operation in which required power to the fuel cell stack is higher than a predetermined power and the fuel cell stack generates power, the controller is configured to stop the second discharger when an intermittent operation in which the required power is equal to or lower than the predetermined power is switched from the power generation operation, and to drive the first discharger when the voltage of the fuel cell stack is equal to or lower than a first predetermined voltage in the intermittent operation in a state where the opening-and-closing valve closes.

The opening-and-closing valve may include a valve body rotatably supported, opens due to force generated by driving the second discharger and one of sucking and discharging the oxidant gas in the power generation operation, and may close due to force generated by driving the first discharger and sucking and discharging the oxidant gas in the intermittent operation.

The opening-and-closing valve may open and close in accordance with an instruction from the controller, and the controller may be configured to control the opening-and-closing valve to close when the intermittent operation is switched from the power generation operation before the first discharger is driven, and to control the opening-and-closing valve to open when the power generation operation is switched from the intermittent operation before the second discharger is driven.

The controller may be configured to stop the first discharger in the power generation operation.

The first discharger and the opening-and-closing valve may be arranged side by side in a direction orthogonal to the flow of the oxidant gas within the oxidant gas flow path.

The first discharger may include a first frame, and a rotating body positioned within the first frame and rotating, the opening-and-closing valve may include a second frame, and a valve body rotatably supported and positioned within the second frame, and the first frame and the second frame may be in contact with an inner wall of the oxidant gas flow path.

The first frame and the second frame may be in contact with each other.

The controller may be configured to close the opening-and-closing valve in the intermittent operation when a state where the voltage of the fuel cell stack is equal to or higher than a second predetermined voltage higher than the first predetermined voltage is shifted from a state where the voltage of the fuel cell stack is lower than the first predetermined voltage.

The oxidant gas flow path may include an air cleaner case including an air element inside, and the first discharger and the opening-and-closing valve may be provided within the air cleaner case.

The first discharger and the opening-and-closing valve may be provided within the air cleaner case at a downstream side of the flow of the oxidant gas with respect to the air element.

The second discharger may be provided at a downstream side of the flow of the oxidant gas with respect to the air element.

The first discharger may be a fan, and the second discharger may be a compressor.

DETAILED DESCRIPTION

Hereinafter, embodiments will be described with reference to the drawings.

First Embodiment

[Schematic Configuration of Fuel Cell System]

Figure 1:
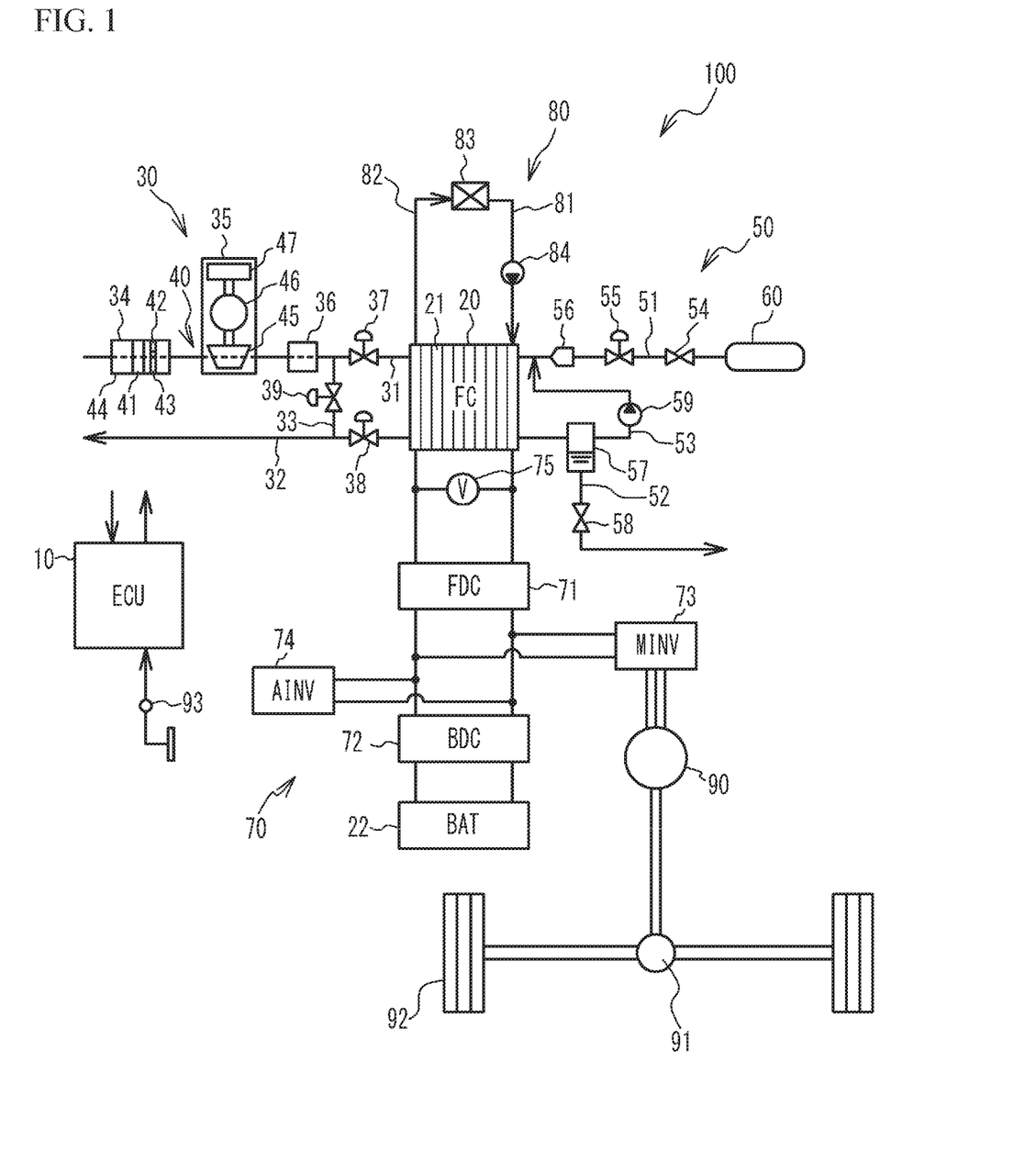
FIG. 1 is a schematic view of a fuel cell system according to a first embodiment mounted on a vehicle.

FIG. 1 is a schematic view of a fuel cell system according to a first embodiment mounted on a vehicle. Referring to FIG. 1, a fuel cell system 100 includes an electronic control unit (ECU) 10, a fuel cell stack (hereinafter, referred to as FC) 20, a secondary battery (hereinafter, referred to as BAT) 22, an oxidant gas system 30, a fuel gas system 50, a power system 70, and a cooling system 80. Further, the vehicle includes a motor 90 for traveling, a transmission 91, wheels 92, and an accelerator opening sensor 93. The vehicle travels by driving the motor 90 using the FC 20 and the BAT 22 as power sources.

The FC 20 receives fuel gas and oxidant gas to generate power. The FC 20 includes a solid polymer electrolyte type of stacked unit cells 21. The unit cell 21 includes a membrane electrode assembly which is a power generator in which electrodes are arranged on both surfaces of an electrolyte membrane, and a pair of separators which sandwich the membrane electrode assembly. The electrolyte membrane is a solid polymer membrane formed of a fluorine-based resin material or a hydrocarbon-based resin material having a sulfonic acid group, and has good proton conductivity in a wet state. The electrode includes a carbon carrier and an ionomer that is a solid polymer having a sulfonic acid group and has good proton conductivity in a wet state. The carbon carrier carries a catalyst, for example, platinum or a platinum-cobalt alloy, for promoting a power generation reaction. The unit cell 21 is provided with manifold for flowing reaction gases and cooling water. The reaction gases flowing through the manifolds are supplied to a power generation region of the unit cell 21 through gas flow paths provided in the unit cell 21.

The oxidant gas system 30 supplies air containing oxygen as the oxidant gas to the FC 20 and discharges the air discharged from the FC 20 to the outside. The oxidant gas system 30 includes a gas supply pipe 31, a gas discharge pipe 32, a bypass pipe 33, an air cleaner 34, an air compressor 35, an intercooler 36, an inlet sealing valve 37, a pressure regulating valve 38, and a bypass valve 39.

The gas supply pipe 31 is connected to a cathode inlet manifold of the FC 20. The gas discharge pipe 32 is connected to a cathode outlet manifold of the FC 20. The bypass pipe 33 communicates the gas supply pipe 31 and the gas discharge pipe 32. The bypass valve 39 is provided in the bypass pipe 33. The bypass valve 39 switches a communication state of the gas supply pipe 31 and the gas discharge pipe 32. The air cleaner 34, the air compressor 35, and the intercooler 36 are arranged in the gas supply pipe 31 in this order from the upstream side of an oxidant gas flow. The inlet sealing valve 37 is provided in the gas supply pipe 31 at the downstream side of the oxidant gas flow with respect to a connection point of the gas supply pipe 31 and the bypass pipe 33. The pressure regulating valve 38 is provided in the gas discharge pipe 32 at the upstream side of the oxidant gas flow with respect to a connection point of the gas discharge pipe 32 and the bypass pipe 33.

The air cleaner 34 includes an air element 41 within an air cleaner case 44. A fan 42 and an opening-and-closing valve 43 are also provided within the air cleaner case 44. The fan 42 has a built-in motor. The fan 42 is a discharger having a discharge pressure of less than 10 kPa. The fan 42 is of, for example, an axial flow type, but may be of a centrifugal type. The fan 42 sucks the air and discharges the sucked air toward the FC 20. The air compressor 35 includes a compressor body 45, a motor 46, and an inverter 47. The compressor body 45 is driven by the motor 46. The air compressor 35 is a discharger having a discharge pressure of 100 kPa or more. As for the motor 46, a rotation speed is, for example, $1 \times 10^5$ rpm or more, and an air bearing is used. By use of the air bearing, it is possible to deal with a high rotation speed such as a rotation speed of $1 \times 10^5$ rpm or more. The air compressor 35 sucks air and discharges the sucked air toward the FC 20. In order to supply a large amount of air to the FC 20, the discharge pressure of the air compressor 35 may be 1 MPa or more, or 10 MPa or more. The air supplied to the FC 20 is discharged through the gas discharge pipe 32 to the outside. The intercooler 36 cools the air supplied to the FC 20. The inlet sealing valve 37 regulates the flow rate of air to the FC 20. The pressure regulating valve 38 regulates a back pressure at the cathode side of the FC 20.

Since the air is supplied to the FC 20 through the gas supply pipe 31, the air cleaner 34, the air compressor 35, and the intercooler 36, these members serves as an oxidant gas flow path 40 that supplies the oxidant gas to the FC 20. The ECU 10 controls the air compressor 35, the inlet sealing valve 37, the pressure regulating valve 38, the bypass valve 39, and the fan 42. The ECU 10 controls the air compressor 35 and the fan 42 to adjust the flow rate of the air to be supplied to the FC 20. Further, the ECU 10 controls the opening degrees of the inlet sealing valve 37, the pressure regulating valve 38, and the bypass valve 39 so as to adjust the flow rate of the air to be supplied to the FC 20 and the flow rate of the bypassed air.

The fuel gas system 50 supplies hydrogen gas as fuel gas to the FC 20, and circulates the hydrogen gas discharged from the FC 20 to the FC 20. The fuel gas system 50 includes a tank 60, a gas supply pipe 51, a gas discharge pipe 52, a gas circulation pipe 53, a tank valve 54, a pressure regulating valve 55, an injector 56, a gas-liquid separator 57, a drain valve 58, and a circulation pump 59.

The tank 60 is connected to an anode inlet manifold of the FC 20 through the gas supply pipe 51. The tank 60 stores hydrogen gas as fuel gas. The gas discharge pipe 52 is connected to an anode outlet manifold of the FC 20. The gas circulation pipe 53 communicates the gas-liquid separator 57 with the gas supply pipe 51. The tank valve 54, the pressure regulating valve 55, and the injector 56 are arranged in the gas supply pipe 51 in this order from the upstream side of the hydrogen gas flow. In a state where the tank valve 54 opens, the opening of the pressure regulating valve 55 is adjusted, and the injector 56 injects the hydrogen gas. Thus, the hydrogen gas is supplied to the FC 20.

The gas discharge pipe 52 is provided with the gas-liquid separator 57 and the drain valve 58 in this order from the upstream side of the hydrogen gas flow. The gas-liquid separator 57 separates and stores moisture from the hydrogen gas discharged from the FC 20. The water stored in the gas-liquid separator 57 is discharged through the gas discharge pipe 52 to the outside, when the drain valve 58 opens. The gas circulation pipe 53 is provided for returning the hydrogen gas to the FC 20. An end of the gas circulation pipe 53 is connected to the gas-liquid separator 57. The other end of the gas circulation pipe 53 is connected to the gas supply pipe 51. The circulation pump 59 is arranged in the gas circulation pipe 53. The hydrogen gas discharged from the FC 20 is suitably pressurized by the circulation pump 59 and introduced to the gas supply pipe 51. The ECU 10 controls the tank valve 54, the pressure regulating valve 55, the injector 56, the drain valve 58, and the circulation pump 59.

The power system 70 includes a fuel cell DC/DC converter (hereinafter, referred to as FDC) 71, a battery DC/DC converter (hereinafter, referred to as BDC) 72, a motor inverter (hereinafter, referred to as MINV) 73, an auxiliary inverter (hereinafter, referred to as AINV) 74, and a voltage sensor 75. The FDC 71 adjusts DC current from the FC 20 and outputs the DC current to the MINV 73 and/or the AINV 74. The BDC 72 adjusts the DC current from the BAT 22 and outputs the DC current to the MINV 73 and/or the AINV 74. The BAT 22 is capable of charging the power generated by the FC 20. The MINV 73 converts the input DC current into three-phase AC power and supplies the three-phase AC power to the motor 90. The motor 90 rotates the wheels 92 via the transmission 91 to travel the vehicle. The power of the FC 20 and the BAT 22 may be supplied to load devices via the AINV 74. The load devices includes auxiliary devices for FC 20 and auxiliary devices for the vehicle. The auxiliary devices for the FC 20 include the above-described air compressor 35, the inlet sealing valve 37, the pressure regulating valve 38, the bypass valve 39, the fan 42, the tank valve 54, the pressure regulating valve 55, the injector 56, the drain valve 58, and the circulation pump 59. The auxiliary devices for the vehicle include, for example, air conditioner, lighting devices, hazard lamps, and the like.

The voltage sensor 75 is attached to the FC 20. The voltage sensor 75 detects, for example, the total voltage of the FC 20, and the ECU 10 obtains the detection result therefrom. The ECU 10 may calculate an average cell voltage by dividing the total voltage of the FC 20 obtained from the voltage sensor 75 by the total number of the unit cells. The voltage sensor 75 is used to control the operation of the FC 20. For example, the detection result of the voltage sensor 75 is used for the intermittent operation of the FC 20. The intermittent operation is an operation mode in which the required power to the FC 20 is equal to or lower than a predetermined power and the power generation of the FC 20 is temporarily stopped. On the other hand, a power generation operation is an operation mode in which the required power to the FC 20 is higher than the predetermined power and the FC 20 generates power. The voltage sensor 75 is an example of a voltage detector. The voltage sensor 75 may detect each voltage of the unit cells. In this case, the ECU 10 may calculate the total voltage of the FC 20 by adding each voltage of the unit cells, or may calculate the average cell voltage by dividing the total voltage of the FC 20 by the total number of the unit cells.

The cooling system 80 cools the FC 20 by circulating the cooling water through a predetermined path. The cooling system 80 includes a supply pipe 81, a discharge pipe 82, a radiator 83, and a water pump 84. The supply pipe 81 is connected to a cooling water supply manifold of the FC 20. The discharge pipe 82 is connected to a cooling water discharge manifold of the FC 20. The radiator 83 is connected to the supply pipe 81 and the discharge pipe 82. The water pump 84 is located in the supply pipe 81. The water pump 84 circulates cooling water as a cooling medium between the FC 20 and the radiator 83 through the supply pipe 81 and the discharge pipe 82. The radiator 83 cools the cooling water discharged from the FC 20 by exchanging heat with the outside air. The ECU 10 controls the water pump 84.

The ECU 10 includes a central processing unit (CPU), a read only memory (ROM), and a random access memory (RAM). The ECU 10 is electrically connected to the accelerator opening sensor 93, the air compressor 35, the inlet sealing valve 37, the pressure regulating valve 38, the bypass valve 39, the fan 42, the tank valve 54, the pressure regulating valve 55, the injector 56, the drain valve 58, the circulation pump 59, and the FDC 71, the BDC 72, and the voltage sensor 75. The ECU 10 calculates the required power P to the FC 20, on the basis of the detection value of the accelerator opening sensor 93, the driving states of the above-described auxiliary devices for the vehicle and for the FC 20, the stored power of the BAT 22, and the like. The ECU 10, according to the required power P to the FC 20, controls the air compressor 35 and the fan 42 to control the flow rate of the air to be supplied to the FC 20, and controls the injector 56 and/or the circulation pump 59 to control the flow rate of the hydrogen gas to be supplied to the FC 20. Additionally, the required power P is power required for the FC 20 configured by the unit cells 21, and does not include power required for components, such as the BAT 22, other than the fuel cell.

[Air Cleaner]

Figure 2:
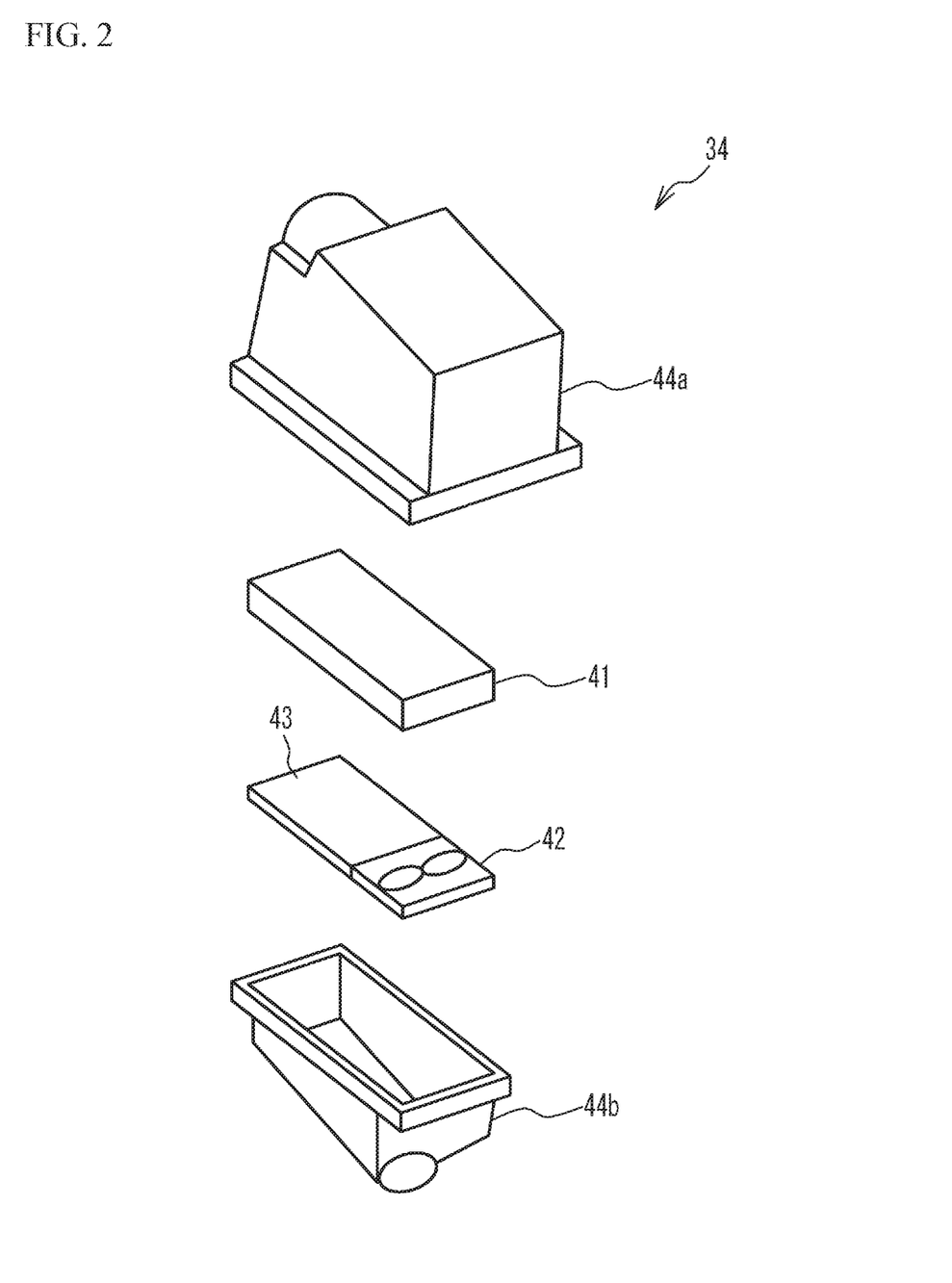
FIG. 2 is an exploded perspective view of a air cleaner in the first embodiment.

FIG. 2 is an exploded perspective view of the air cleaner in the first embodiment. Referring to FIG. 2, the air cleaner 34 includes an upper air cleaner case 44a, a lower air cleaner case 44b, and the air element 41. The upper air cleaner case 44a and the lower air cleaner case 44b are connected to form the air cleaner case 44. The air element 41 is disposed within the air cleaner case 44. Further, the fan 42 and the opening-and-closing valve 43 are also arranged within the air cleaner case 44. Air as the oxidant gas flows into the air cleaner case 44 and through the air element 41, so that foreign substances such as dust contained in the air are removed.

Figure 3A:
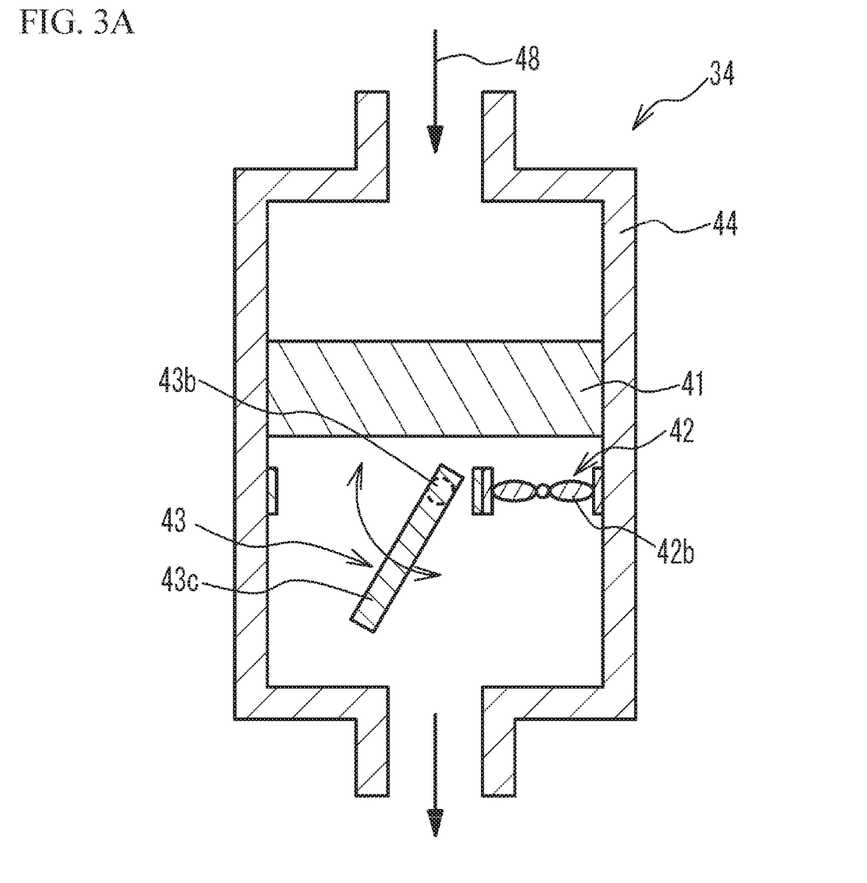
FIG. 3A is a cross-sectional view of the air cleaner in the first embodiment.
Figure 3B:
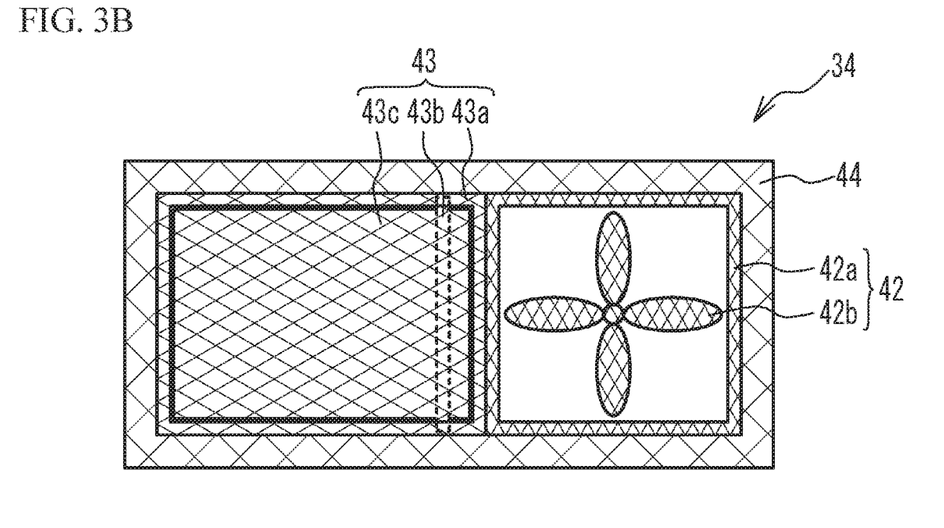
FIG. 3B is a plan view of a fan and an opening-and-closing valve viewed in a direction in which air flows.

FIG. 3A is a cross-sectional view of the air cleaner in the first embodiment. FIG. 3B is a plan view of the fan and the opening-and-closing valve when viewed in the direction in which air flows. In FIGS. 3A and 3B, the air cleaner 34 is illustrated in a simplified manner for clarity. FIG. 3B illustrates a state in which the opening-and-closing valve 43 closes. Each part is cross-hatched for clarity in FIG. 3B. Referring to FIGS. 3A and 3B, the fan 42 and the opening-and-closing valve 43 provided within the air cleaner case 44 are arranged in a direction intersecting (orthogonal to) a flow of air 48 flowing in the air cleaner case 44. Since the air 48 to be supplied to the FC 20 flows into the air cleaner case 44, the oxidant gas flow path 40 (see FIG. 1) for supplying the oxidant gas to the FC 20 includes the air cleaner case 44 having the air element 41 therein. Since the opening-and-closing valve 43 and the fan 42 are provided side by side, the opening-and-closing valve 43 opens and closes a partial area of the oxidant gas flow path 40 next to the fan 42.

The fan 42 includes a frame 42a and a rotating body 42b as a rotating propeller. The rotating body 42b is located within the frame 42a. The opening-and-closing valve 43 includes a frame 43a, a valve rod 43b, and a valve body 43c. The opening-and-closing valve 43 is made of, for example, a resin material such as an olefin elastomer, but may be made of another material (an insulating material or a metal material). Both ends of the valve rod 43b are rotatably supported by the frame 43a. The valve body 43c is rotatably supported about the valve rod 43b and by the frame 43a. The valve body 43c rotates about the valve rod 43b as an axis, whereby the opening-and-closing valve 43 opens and closes the partial area of the flow path next to the fan 42. When the opening-and-closing valve 43 opens, the air 48 easily flows through the opening-and-closing valve 43. When the opening-and-closing valve 43 closes, the air 48 hardly flows through the opening-and-closing valve 43. The fan 42 and the opening-and-closing valve 43 are arranged within the air cleaner case 44 at the downstream side of the flow of the air 48 with respect to the air element 41.

The frame 42a of the fan 42 and the frame 43a of the opening-and-closing valve 43 are in contact with and fixed to an inner wall of the air cleaner case 44. The frame 42a of the fan 42 and the frame 43a of the opening-and-closing valve 43 are in contact with and fixed to each other. Therefore, the fan 42 and the opening-and-closing valve 43 are provided over the entire cross section of the air cleaner case 44 in a direction orthogonal to the flow of the air 48. The opening-and-closing valve 43 may occupy 70% or more, 80% or more, 90% or more of the area where the fan 42 is not provided in the cross section of the air cleaner case 44 in a direction orthogonal to the flow of the air 48. Further, the opening-and-closing valve 43 is not limited to the case where one valve body is provided, but may be provided with two or more valve bodies.

[Opening and Closing of Opening-and-Closing Valve]

Figure 4A:
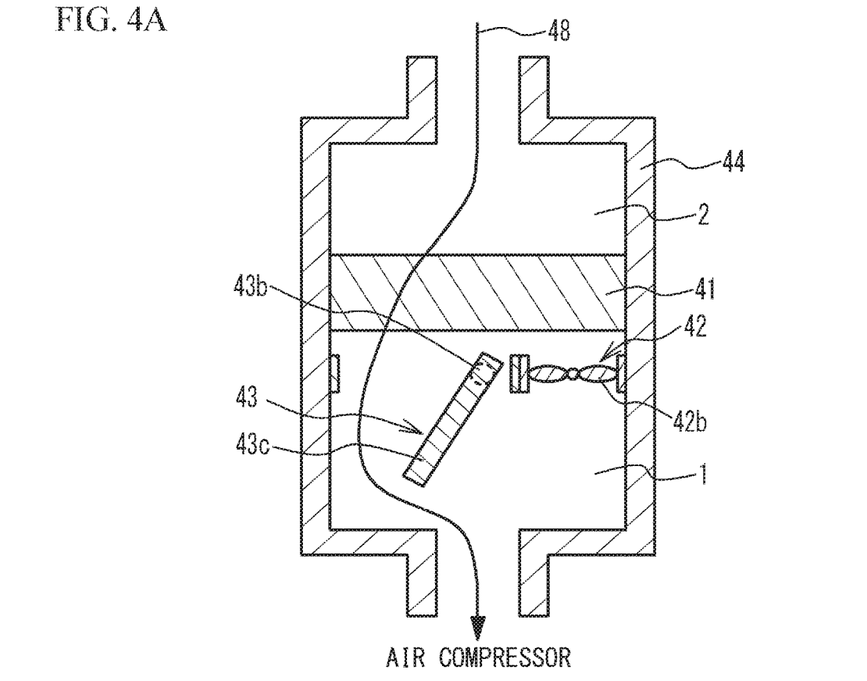
FIGS. 4A and 4B are cross-sectional views explaining opening and closing of the opening-and-closing valve.
Figure 4B:
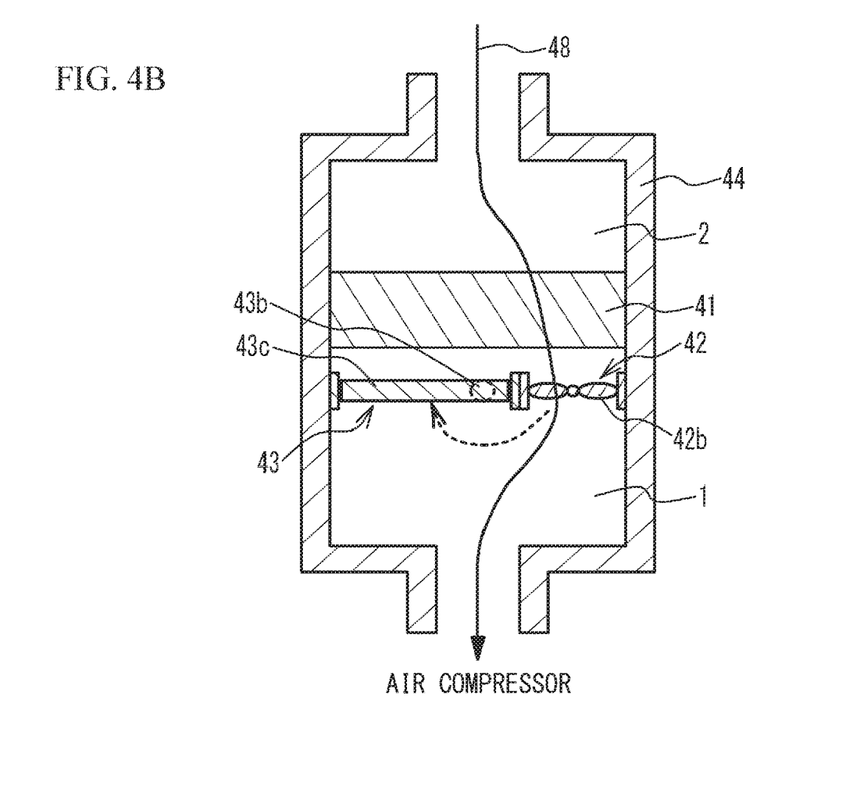

FIGS. 4A and 4B are cross-sectional views illustrating opening and closing of the opening-and-closing valve. FIG. 4A illustrates a state in which the opening-and-closing valve 43 opens. FIG. 4B illustrates a state in which the opening-and-closing valve 43 closes. As described with reference to FIG. 1, the air compressor 35 is provided at the downstream side of the flow of the air 48 with respect to the fan 42 and the opening-and-closing valve 43. For this reason, the fan 42 is stopped and the air compressor 35 is driven, and the air compressor 35 sucks the air 48, which causes a pressure in a space 1 to be lower than a pressure in a space 2, as illustrated in FIG. 4A. That is, the pressure in the space 1 becomes negative pressure. The space 1 is located at a side of the air compressor 35 with respect to the fan 42 and the opening-and-closing valve 43 in the air cleaner case 44. The space 2 is located at a side opposite to the air compressor 35 with respect to the fan 42 and the opening-and-closing valve 43 in the air cleaner case 44. As a result, force is exerted on the opening-and-closing valve 43 in an opening direction of the valve body 43c, and then the opening-and-closing valve 43 opens.

In contrast, the air compressor 35 is stopped and the fan 42 is driven, and the fan 42 sucks and discharges the air, which causes the pressure in the space 1 to be higher than the pressure in the space 2, as illustrated in FIG. 4B. That is, the pressure in the space 1 becomes positive pressure. Thus, force is exerted on the opening-and-closing valve 43 in a closing direction of the valve body 43c, and then the opening-and-closing valve 43 closes. The opening-and-closing valve 43 closes, whereby the air 48 discharged from the fan 42 into the space 1 is suppressed from flowing backward into the space 2 as indicated by a dashed arrow.

In the above manner, the opening-and-closing valve 43 opens due to the force generated by driving the air compressor 35 and sucking and discharging the air 48, and closes due to the force generated by driving the fan 42 and sucking and discharging the air 48.

[Intermittent Operation Control of ECU]

Figure 5:
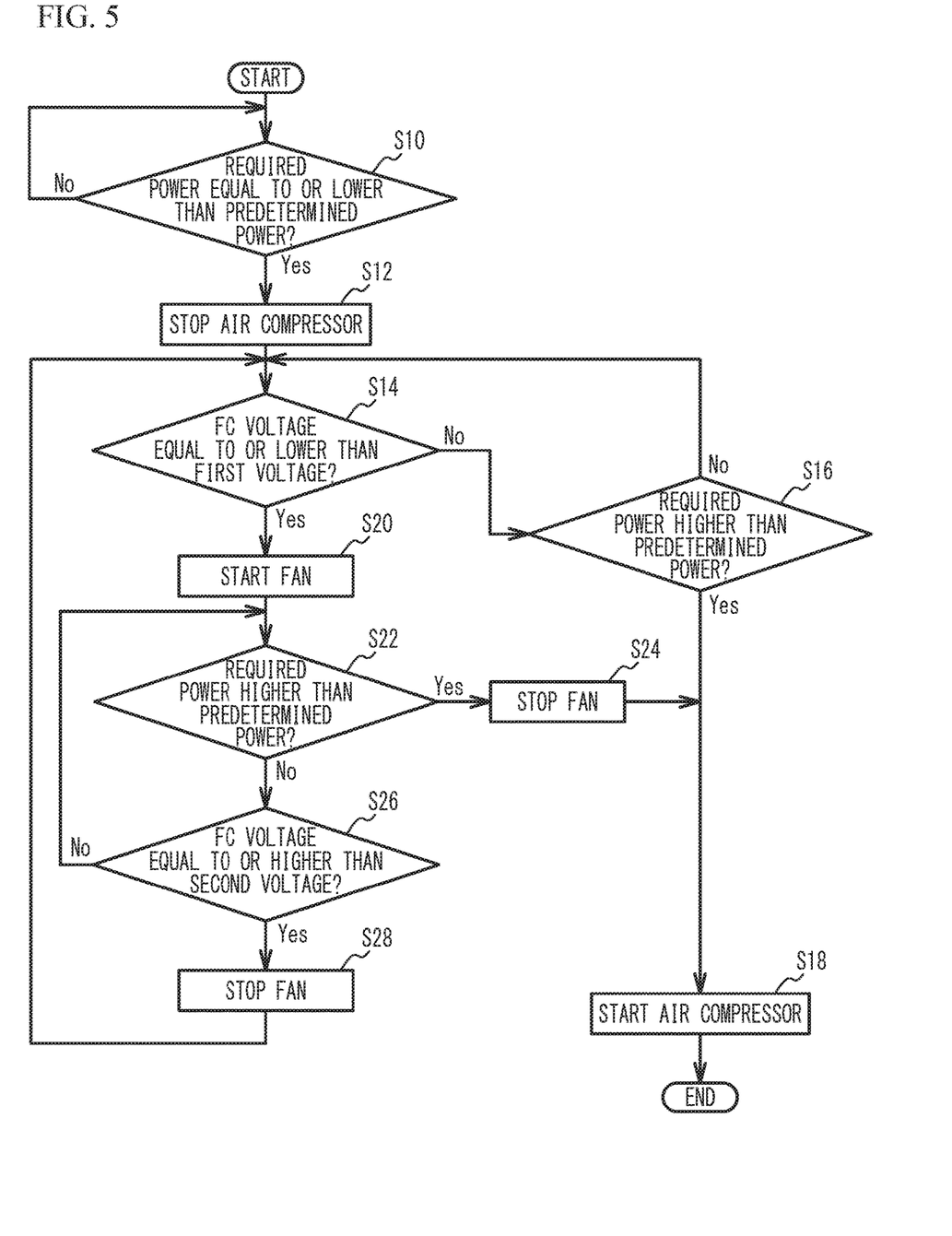
FIG. 5 is a flowchart illustrating an example of intermittent operation control of an ECU in the first embodiment.

FIG. 5 is a flowchart illustrating an example of intermittent operation control of the ECU in the first embodiment. The control illustrated in FIG. 5 starts during the power generation operation in which the required power to the FC 20 is higher than the predetermined power and the FC 20 generates power. In the power generation operation, the air compressor 35 is driven and the fan 42 is stopped. The intermittent operation is an operation mode in which the power of the BAT 22 is used to temporarily stop the power generation of the FC 20 when the required power to the FC 20 is lower than a predetermined power and the output of the FC 20 is low with low power generation efficiency. Therefore, a predetermined power is a value determined based on the power generation efficiency of the FC 20, and is a threshold value set so as to suppress the deterioration of the power generation efficiency.

Referring to FIG. 5, the ECU 10 waits until the required power to the FC 20 is equal to or lower than a predetermined power (step S10). When the ECU 10 determines that the required power to the FC 20 is equal to or lower than the predetermined power (step S10: Yes), the ECU 10 switches from the power generation operation to the intermittent operation and stops the operation of the air compressor 35 (step S12). In switching to the intermittent operation, a switching element provided in the FDC 71 is turned off and/or the sweep current is reduced to zero. In the intermittent operation, the supply of hydrogen gas may be stopped from the viewpoint of improving fuel efficiency. The operation of the air compressor 35 is stopped, so that the average cell voltage of the FC 20 decreases. When the average cell voltage of the FC 20 is too low, the performance of the unit cell 21 is deteriorated. Therefore, the ECU 10 determines whether or not the average cell voltage of the FC 20 is equal to or lower than a first predetermined voltage (Step S14). Herein, the first predetermined voltage is a voltage value serving as a threshold value for determining whether or not to suppress the performance deterioration of the unit cell 21. The first predetermined voltage is, for example, 0.55 V or more and 0.65 V or less. When the average cell voltage of the FC 20 is not equal to or lower than the first predetermined voltage (Step S14: No), the ECU 10 determines whether or not the required power to the FC 20 is higher than the predetermined power (Step S16).

When the required power to the FC 20 is higher than the predetermined power (Step S16: Yes), the ECU 10 starts the air compressor 35 so that an amount of air corresponding to the required power is supplied to the FC 20 (Step S18). When the required power to the FC 20 is not larger than the predetermined power (step S16: No), the process returns to step S14.

When the average cell voltage of the FC 20 is equal to or lower than the first predetermined voltage in step S14 (step S14: Yes), the ECU 10 starts the fan 42 (step S20). The fan 42 is driven to supply air to the FC 20, and then the average cell voltage of the FC 20 increases. Further, the air compressor 35 is stopped and the fan 42 is driven, whereby the opening-and-closing valve 43 closes and the air discharged from the fan 42 is suppressed from flowing backward as described with reference to FIG. 4B.

Next, the ECU 10 determines whether or not the required power to the FC 20 is higher than a predetermined power (step S22). When the required power to the FC 20 is higher than the predetermined power (Step S22: Yes), the ECU 10 stops the operation of the fan 42 (Step S24). After that, the ECU 10 starts the air compressor 35 to supply an appropriate amount of air according to the required power to the FC 20 (step S18). When the fan 42 is stopped and the air compressor 35 is driven, the opening-and-closing valve 43 opens and the air compressor 35 sucks air through the opening-and-closing valve 43 as described with reference to FIG. 4A.

When the required power to the FC 20 is not higher than the predetermined power (Step S22: No), the ECU 10 determines whether or not the average cell voltage of the FC 20 is equal to or higher than a second predetermined voltage, the second predetermined voltage being higher than the first predetermined voltage (Step S26). When the fan 42 is driven to supply air to the FC 20, the average cell voltage of the FC 20 increases. However, if the average cell voltage of the FC 20 is too high, the catalyst provided in the unit cell 21 might elute. Therefore, when the average cell voltage of the FC 20 is equal to or higher than the second predetermined voltage (Step S26: Yes), the operation of the fan 42 is stopped (Step S28). The operation of the fan 42 is stopped, so that the average cell voltage of the FC 20 decreases. Herein, the second predetermined voltage is a voltage value serving as a threshold value for determining whether or not to suppress elution of the catalyst provided in the unit cell 21. The second predetermined voltage is, for example, 0.8 V or more and 0.9 V or less.

If the average cell voltage of the FC 20 is not equal to or higher than the second predetermined voltage (Step S26: No), the process returns to Step S22. After stopping the operation of the fan 42 in step S28, the process returns to step S14.

[Timing Chart]

Figure 6:
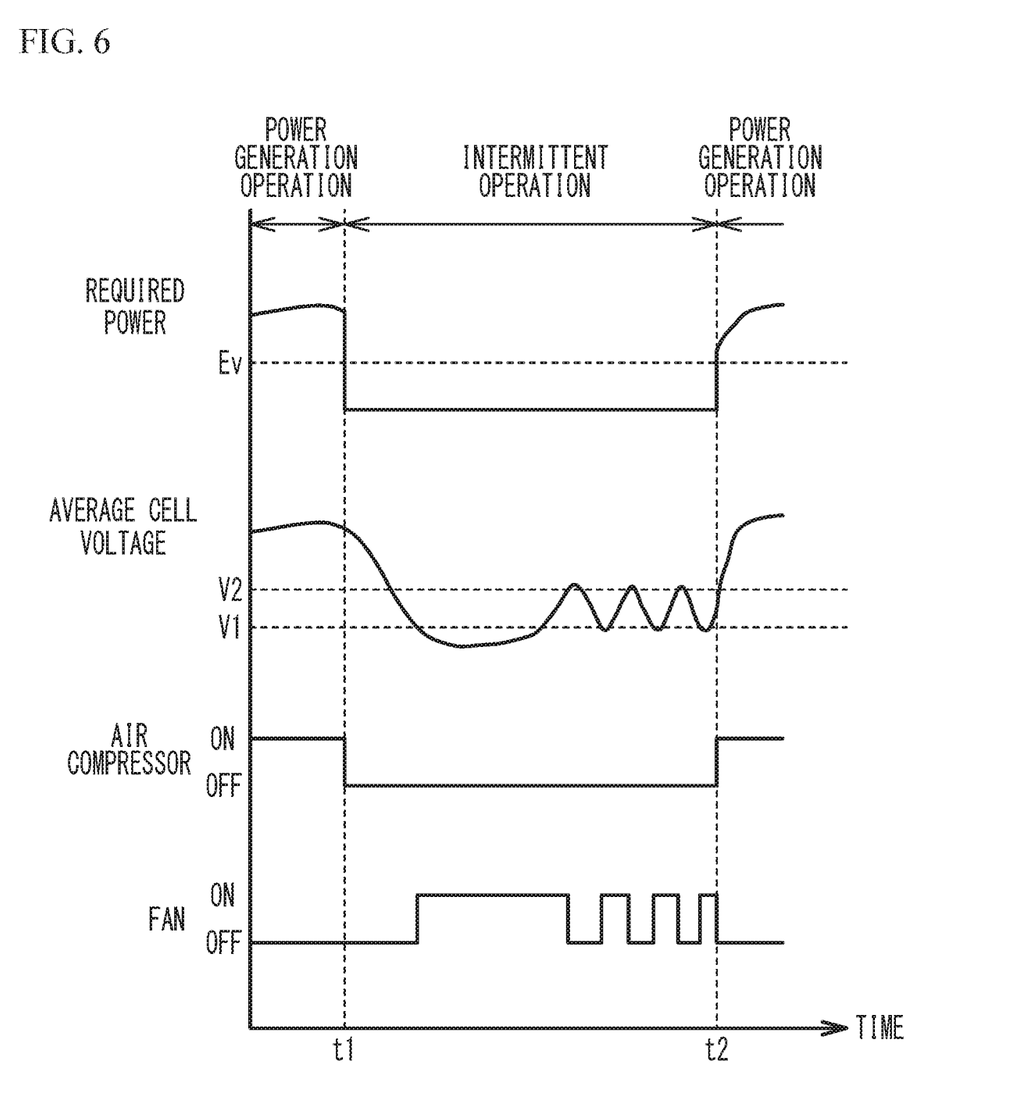
FIG. 6 is a timing chart illustrating an example of the intermittent operation control of the ECU in the first embodiment.

FIG. 6 is a timing chart illustrating an example of the intermittent operation control of the ECU in the first embodiment. FIG. 6 illustrates the required power to the FC 20, the average cell voltage of the FC 20, the driving state of the air compressor 35, and the driving state of the fan 42. Referring to FIG. 6, for example, when the opening degree of the accelerator pedal is increased by a driver's operation, the required power to the FC 20 is increased. When the required power to the FC 20 is higher than the predetermined power Ev, the air compressor 35 is driven and the fan 42 is stopped in accordance with instructions from the ECU 10, which performs the power generation operation. When the fan 42 is stopped and the air compressor 35 is driven, the opening-and-closing valve 43 opens as described with reference to FIG. 4A. The opening-and-closing valve 43 opens, so that the air compressor 35 sucks air through the opening-and-closing valve 43, which suppresses pressure loss in sucking air. This efficiently supplies air to the FC 20. The amount of air supplied to the FC 20 by the air compressor 35 corresponds to the required power to the FC 20, and is, for example, from 200 Nl/min to 5000 Nl/min.

For example, when the opening of the accelerator pedal is reduced by the driver's operation, the required power to the FC 20 is reduced. When the required power to the FC 20 is equal to or lower than the predetermined power Ev, the operation is switched to the intermittent operation (time t1), and the operation of the air compressor 35 is stopped in accordance with instructions from the ECU 10. When the air compressor 35 is stopped, the average cell voltage of the FC 20 gradually decreases. When the average cell voltage of the FC 20 decreases to the first predetermined voltage V1, the operation of the fan 42 is started in accordance with instructions from the ECU 10. When the air compressor 35 is stopped and the fan 42 is driven, the opening-and-closing valve 43 closes as described with reference to FIG. 4B. The opening-and-closing valve 43 closes, so that the air discharged from the fan 42 is suppressed from flowing backward through the opening-and-closing valve 43. This efficiently supplies the air to the FC 20. The amount of air supplied to the FC 20 by the fan 42 is as small as, for example, 10 Nl/min or less.

The fan 42 is driven, so that the average cell voltage of the FC 20 gradually increases. When the average cell voltage of the FC 20 increases to the second predetermined voltage V2, the operation of the fan 42 is stopped in accordance with instructions from the ECU 10. The fan 42 is stopped, so that the average cell voltage of the FC 20 gradually decreases.

The ECU 10 controls the operation of the fan 42 such that the average cell voltage of the FC 20 falls substantially between the first predetermined voltage V1 and the second predetermined voltage V2 until the required power to the FC 20 is higher than the predetermined power Ev. When the required power to the FC 20 is higher than the predetermined power Ev, the operation is switched to the power generation operation (time t2), and then the operation of the fan 42 is stopped and the operation of the air compressor 35 is started in accordance with instructions from the ECU 10.

In the first embodiment, the fan 42 and the opening-and-closing valve 43 arranged side by side in the direction intersecting the flow of the air 48 (oxidant gas) are provided within the air cleaner case 44 (oxidant gas flow path 40). The opening-and-closing valve 43 opens and closes the partial area of the oxidant gas flow path 40 next to the fan 42. The air compressor 35 is provided at the downstream side of the flow of the air 48 with respect to the fan 42 and the opening-and-closing valve 43. The ECU 10 drives the air compressor 35 in a state where the opening-and-closing valve 43 opens in the power generation operation. Since the discharge pressure of the air compressor 35 is high, the air compressor 35 supplies a large amount of air to the FC 20 in accordance with the required power to the FC 20. Further, since the opening-and-closing valve 43 opens, air to be sucked by the air compressor 35 flows through the opening-and-closing valve 43, which efficiently supplies the air to the FC 20. The ECU 10 stops the air compressor 35, when the intermittent operation is switched from the power generation operation. When the average cell voltage of the FC 20 is equal to or lower than the first predetermined voltage in the intermittent operation, the ECU 10 drives the fan 42 in a state where the opening-and-closing valve 43 closes. The discharge pressure of the fan 42 is smaller than that of the air compressor 35, which suppresses the power consumption in the intermittent operation. Further, the opening-and-closing valve 43 closes, which suppresses the backflow of the air discharged from the fan 42, and which efficiently supplies air to the FC 20. In this manner, air is efficiently supplied according to the power generation state of the FC 20. The fan 42 and the opening and closing valve 43 are provided side by side within the air cleaner case 44, which suppresses an increases in size of the fuel cell system 100.

The opening and closing valve 43, including the valve body 43c rotatably supported, opens due to the force generated by driving the air compressor 35 and sucking air in the power generation operation as illustrated in FIG. 4A, and closes due to the force generated by driving the fan 42 and sucking and discharging air in the intermittent operation as illustrated in FIG. 4B. Accordingly, as compared to a case of electrically controlling the opening-and-closing valve 43 to open and close, electric wiring is not used to simplify the configuration and to suppress power consumption.

As illustrated in FIGS. 3A and 3B, the fan 42 and the opening-and-closing valve 43 are arranged side by side in a direction orthogonal to the flow of the air 48 within the air cleaner case 44. This reduces an installation space for the fan 42 and the opening-and-closing valve 43. Further, the fan 42 is driven in a state where the opening-and-closing valve 43 closes, which effectively suppresses the backflow of the air 48 discharged from the fan 42. In order to suppress the backflow of the air 48 discharged from the fan 42, the frame 42a of the fan 42 and the frame 43a of the opening-and-closing valve 43 may be in contact with the inner wall of the air cleaner case 44. The frame 42a of the fan 42 and the frame 43a of the opening-and-closing valve 43 may be in contact with each other.

The ECU 10 stops the fan 42 in the power generation operation as illustrated in FIGS. 5 and 6. This reduces power consumption.

As illustrated in FIGS. 5 and 6, the ECU 10 stops the fan 42 in a state in which the opening-and-closing valve 43 closes, when a case where the average cell voltage of the FC 20 is equal to or higher than the second predetermined voltage is shifted from a case where the average cell voltage of the FC 20 is equal to or lower than the first predetermined voltage in the intermittent operation. This effectively suppresses air from being supplied to the FC 20, and effectively suppresses eluting of the catalyst provided in the unit cell 21 due to an increase in the average cell voltage of the FC 20.

Although the fan 42 and the opening-and-closing valve 43 provided within the air cleaner case 44 are exemplified, the fan 42 and the opening-and-closing valve 43 may be provided within the oxidant gas flow path 40 other than the air cleaner case 44, for example, within the gas supply pipe 31. In light of ensuring the space for providing the fan 42 and the opening-and-closing valve 43 and of minimizing the process for providing the fan 42 and the opening-and-closing valve 43, the fan 42 and the opening-and-closing valve 43 are provided within the air cleaner case 44.

The fan 42 and the opening-and-closing valve 43 are provided within the air cleaner case 44 at the downstream side of the flow of the air 48 with respect to the air element 41 as illustrated in FIG. 3A. The air element 41 removes moisture in addition to dust from air, so that the fan 42 sucks the air containing low moisture. This suppresses an influence on water resistance of the fan 42.

The air compressor 35 is provided at a downstream side of the flow of the air 48 with respect to the air element 41. Thus, the air compressor 35 sucks the air containing low moisture, which suppresses an influence on water resistance of the air compressor 35.

Variation of First Embodiment

Figure 7A:
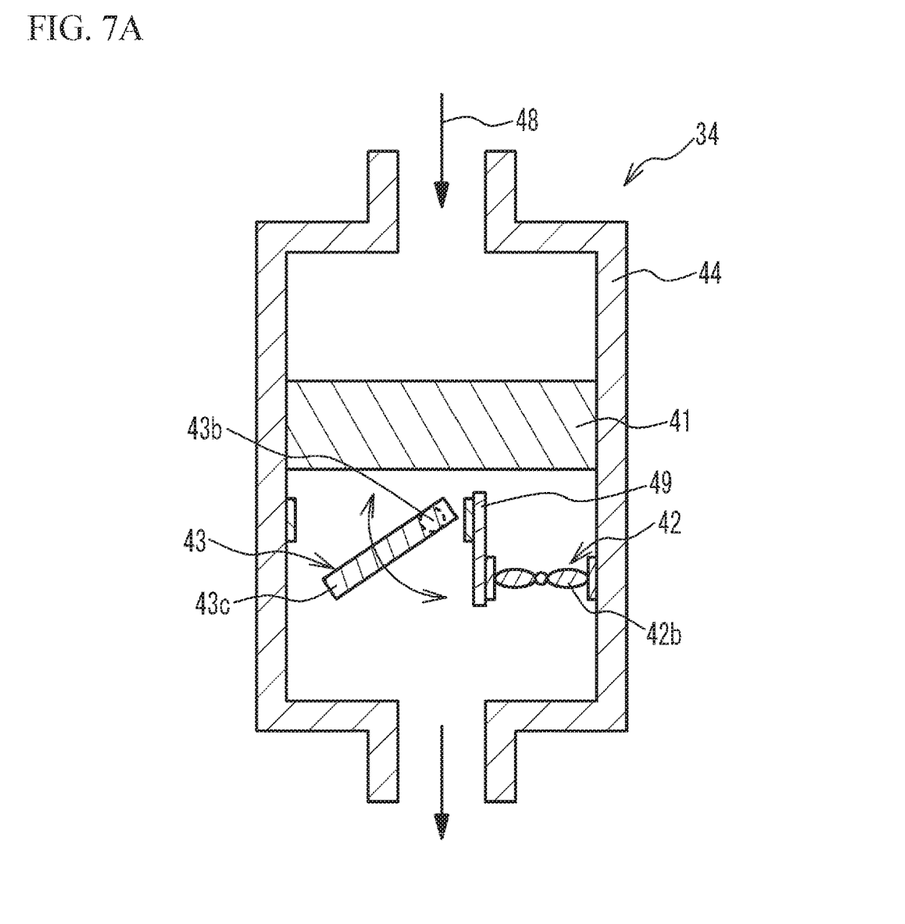
FIG. 7A is a cross-sectional view of an air cleaner in a variation of the first embodiment.
Figure 7B:
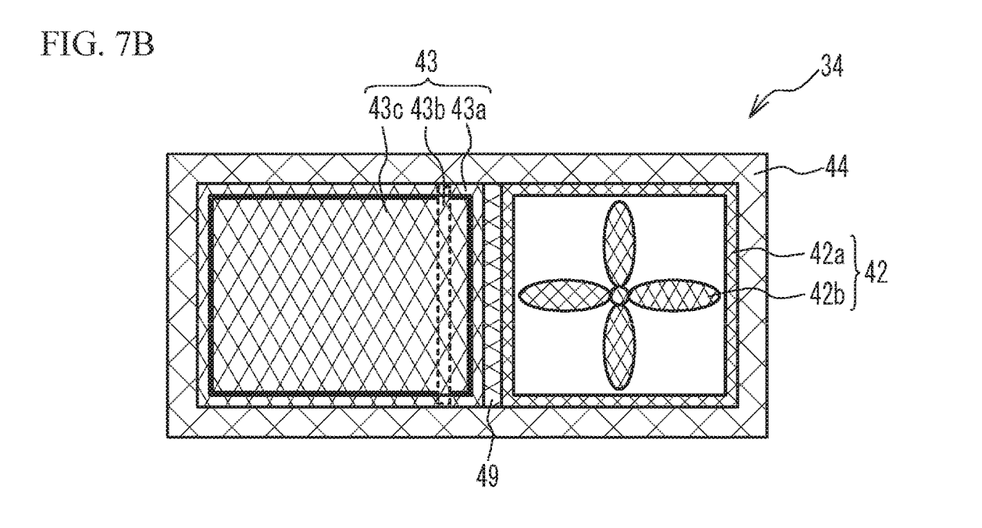
FIG. 7B is a plan view of a fan and an opening-and-closing valve viewed in the direction in which air flows.

FIG. 7A is a cross-sectional view of an air cleaner in a variation of the first embodiment. FIG. 7B is a plan view of the fan and the opening-and-closing valve when viewed in the direction in which air flows. In FIGS. 7A and 7B, the air cleaner 34 is illustrated in a simplified manner for clarity. FIG. 7B illustrates a state in which the opening-and-closing valve 43 closes. In FIG. 7B, each part is cross-hatched for clarity. With reference to FIGS. 7A and 7B, a connecting wall 49 for connecting the fan 42 and the opening-and-closing valve 43 is provided therebetween. The fan 42 and the opening-and-closing valve 43 are respectively arranged in front and rear positions in the direction of the flow of the air 48. FIG. 7A illustrates a case where the fan 42 is located at a downstream side of the flow of the air 48 with respect to the opening-and-closing valve 43, but the fan 42 may be located at an upstream side of the flow of the air 48 with respect to the opening-and-closing valve 43. Other components are the same as those in FIGS. 3A and 3B in the first embodiment, and thus description thereof is omitted.

As in the variation of the first embodiment, the connection wall 49 for connecting the fan 42 and the opening-and-closing valve 43 is provided therebetween, and the fan 42 and the opening-and-closing valve 43 are arranged side by side in the direction intersecting the flow of the air 48 so as to be respectively arranged in front and rear positions in the direction of the flow of the air 48. Even in a case of providing the connecting wall 49, the fan 42 and the opening-and-closing valve 43 may be provided side by side in the direction orthogonal to the flow of the air 48.

Second Embodiment

Figure 8:
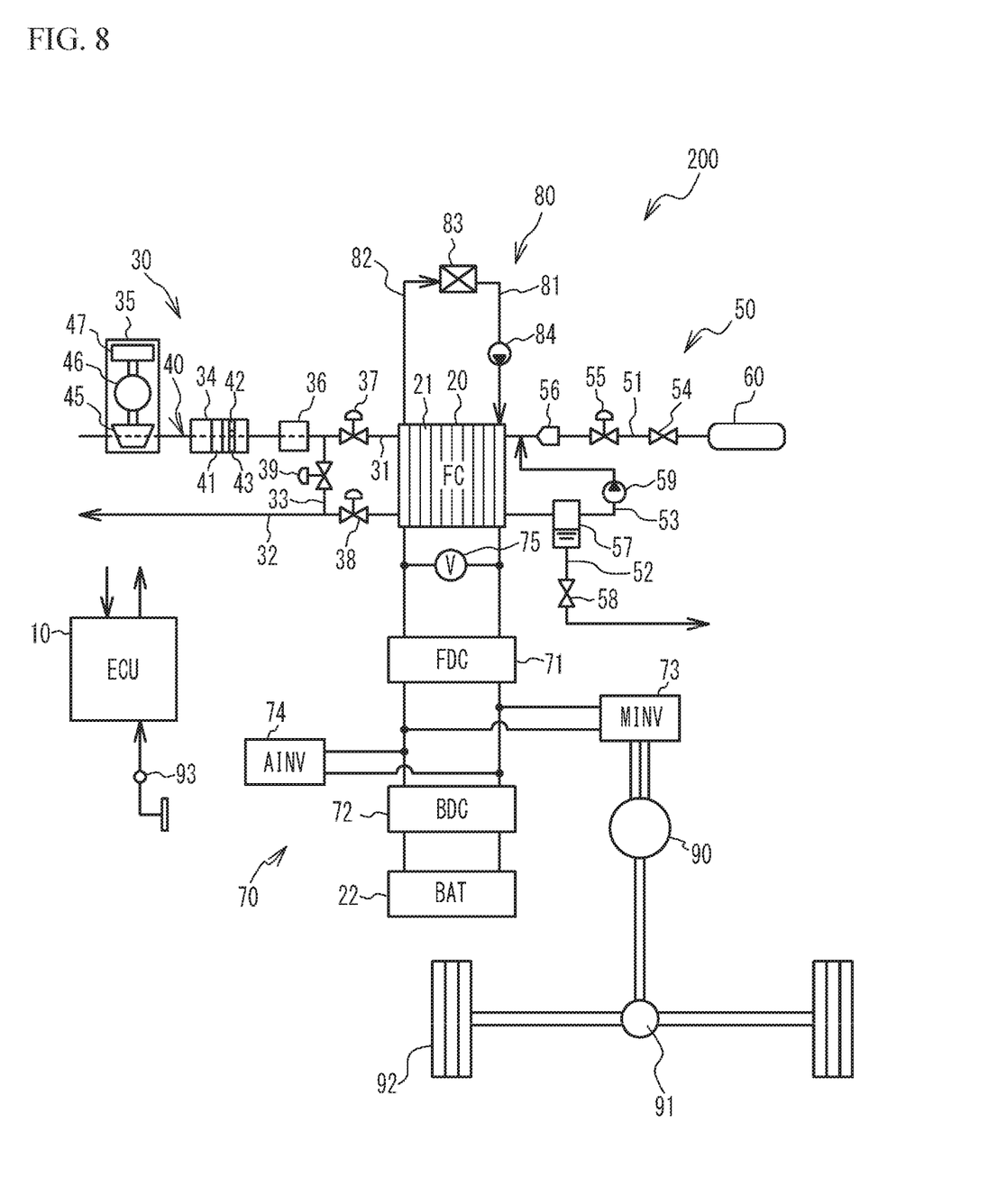
FIG. 8 is a schematic view of a fuel cell system according to a second embodiment mounted on the vehicle.

FIG. 8 is a schematic view of a fuel cell system according to a second embodiment mounted on a vehicle. Referring to FIG. 8, in a fuel cell system 200 according to the second embodiment, the air compressor 35, the air cleaner 34, and the intercooler 36 are arranged in this order from the upstream side of the flow of the oxidant gas flowing through the gas supply pipe 31. The other components are the same as those in the first embodiment, and the description is omitted.

The first embodiment exemplifies the air compressor 35 provided at the downstream side of the oxidant gas flow with respect to the fan 42 and the opening-and-closing valve 43 as described above. However, in the second embodiment, the air compressor 35 is provided at an upstream side of the oxidant gas flow with respect to the fan 42 and the opening-and-closing valve 43. Also in the second embodiment, the opening-and-closing valve 43 opens due to the force generated by driving the air compressor 35 and discharging air in the power generation operation, and the opening-and-closing valve 43 closes due to the force generated by driving the fan 42 and sucking and discharging air in the intermittent operation.

Third Embodiment

A third embodiment differs from the first embodiment in that the opening-and-closing valve 43 is an electromagnetic valve or a motor-operated valve, and that the opening and closing of the opening-and-closing valve 43 is controlled in accordance with instructions from the controller 10. The other components are the same as those in the first embodiment, and the description is omitted.

[Intermittent Operation Control of ECU]

Figure 9:
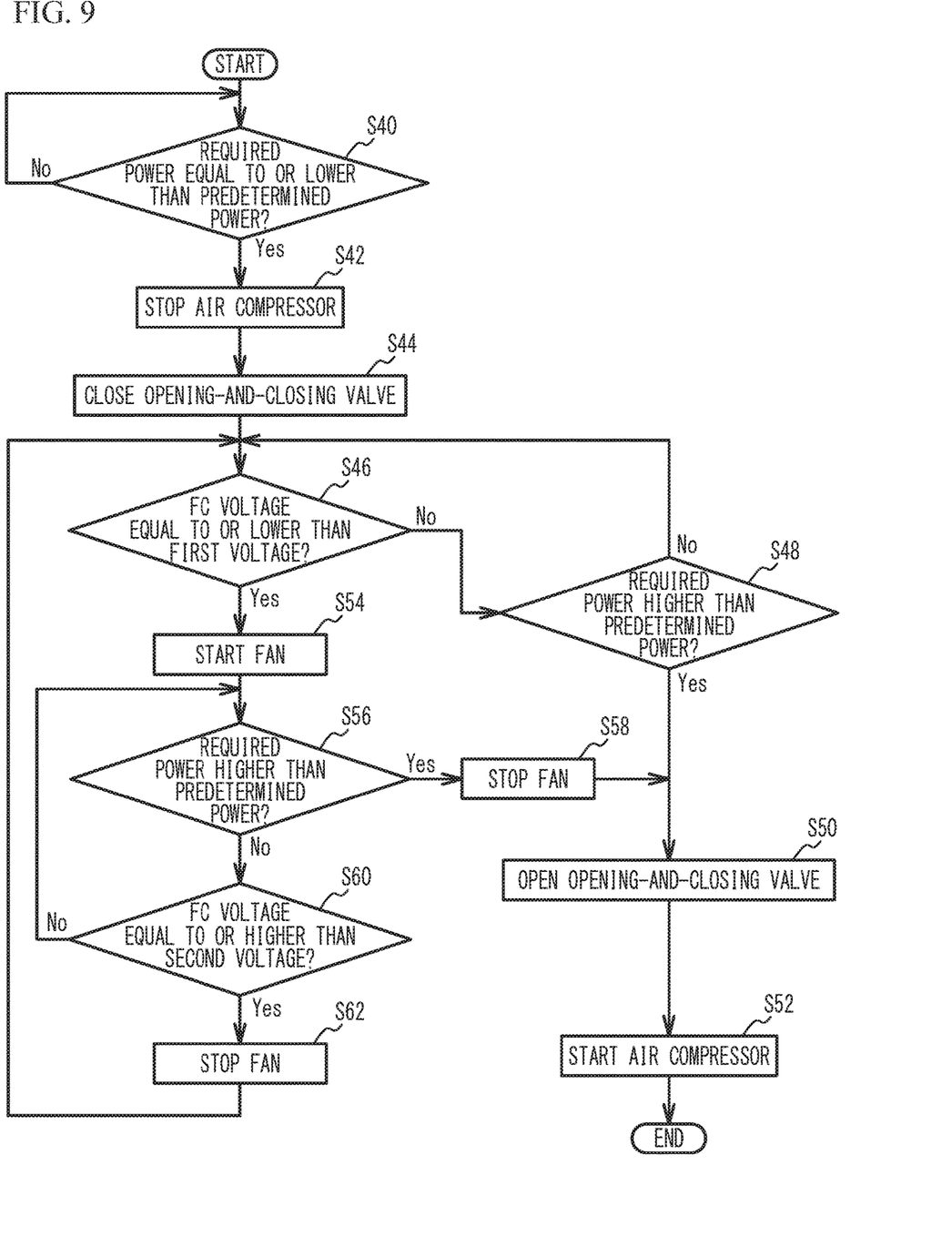
FIG. 9 is a flowchart illustrating an example of intermittent operation control of the ECU in a third embodiment.

FIG. 9 is a flowchart illustrating an example of intermittent operation control of the ECU in the third embodiment. Like the control in the first embodiment illustrated in FIG. 5, the control illustrated in FIG. 9 starts in the power generation operation in which the required power to the FC 20 is higher than the predetermined power and the FC 20 generates power. Referring to FIG. 9, the ECU 10 executes the same steps S40 and S42 as steps S10 and S12 in the first embodiment in FIG. 5. After step S42, the ECU 10 instructs the opening-and-closing valve 43 to close (step S44).

Next, the ECU 10 determines whether or not the average cell voltage of the FC 20 is equal to or lower than the first predetermined voltage (step S46). When the average cell voltage of the FC 20 is not equal to or lower than the first predetermined voltage (step S46: No), the ECU 10 determines whether or not the required power to the FC 20 is higher than the predetermined power (step S48). When the required power to the FC 20 is higher than the predetermined power (step S48: Yes), the ECU 10 instructs the opening-and-closing valve 43 to open (step S50), and starts the air compressor 35 so as to supply an amount of air corresponding the required power to the FC 20 (step S52). When the required power to the FC 20 is not higher than the predetermined power (step S48: No), the process returns to step S46.

In step S46, when the average cell voltage of the FC 20 is equal to or lower than the first predetermined voltage (step S46: Yes), the ECU 10 executes steps S54 to S62, which are the same as steps S20 to S28 in the first embodiment in FIG. 5.

[Timing Chart]

Figure 10:
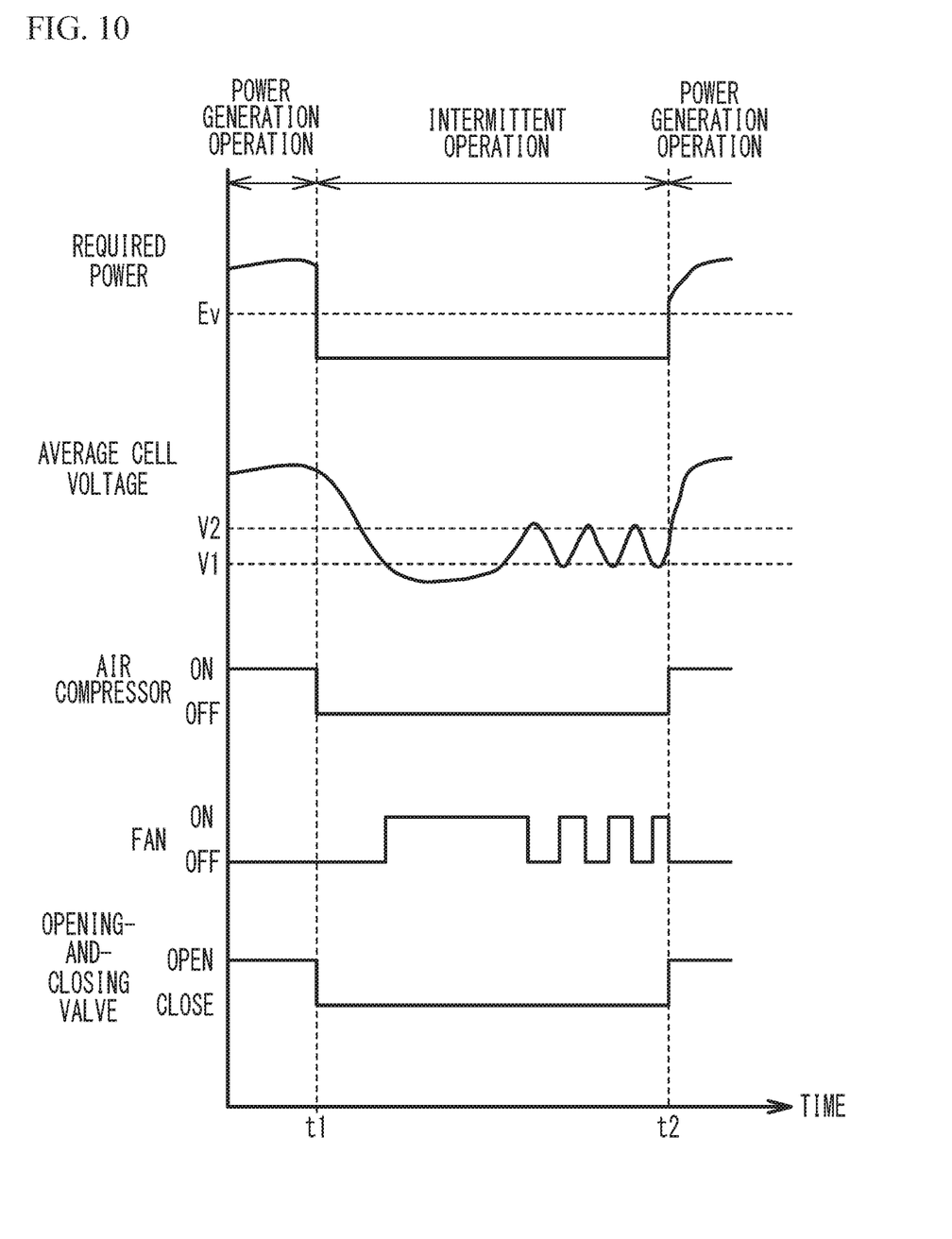
FIG. 10 is a timing chart illustrating an example of the intermittent operation control of the ECU in the third embodiment.

FIG. 10 is a timing chart illustrating an example of the intermittent operation control of the ECU in the third embodiment. FIG. 10 illustrates the required power to the FC 20, the average cell voltage of the FC 20, the driving state of the air compressor 35, the driving state of the fan 42, and the opening and closing state of the opening-and-closing valve 43. Referring to FIG. 10, when the required power to the FC 20 is higher than the predetermined power Ev, the air compressor 35 is driven, the fan 42 is stopped, and the opening-and-closing valve 43 opens in accordance with instructions from the ECU 10, and the power generation operation is performed under the above-described conditions.

When the required power to the FC 20 is equal to or lower than the predetermined power Ev, the operation is switched to the intermittent operation (time t1), the operation of the air compressor 35 is stopped and the opening-and-closing valve 43 closes in accordance with instructions from the ECU 10. The air compressor 35 is stopped, so that the average cell voltage of the FC 20 gradually decreases. The average cell voltage of the FC 20 decreases to the first predetermined voltage V1, and then the operation of the fan 42 is started in accordance with instructions from the ECU 10. The fan 42 is driven, so that the average cell voltage of the FC 20 gradually increases. When the average cell voltage of the FC 20 increases to the second predetermined voltage V2, the operation of the fan 42 is stopped in accordance with instructions from the ECU 10. The fan 42 is stopped, so that the average cell voltage of the FC 20 gradually decreases.

The ECU 10 controls the operation of the fan 42 such that the average cell voltage of the FC 20 falls substantially between the first predetermined voltage V1 and the second predetermined voltage V2 until the required power to the FC 20 is higher than the predetermined power Ev. When the required power to the FC 20 is higher than the predetermined power Ev, the operation is switched to the power generation operation (time t2), the operation of the fan 42 is stopped, the opening-and-closing valve 43 opens, and the operation of the air compressor 35 is started in accordance with instructions from the ECU 10.

According to the third embodiment, the opening-and-closing valve 43 is a valve that opens and closes in accordance with instructions from the ECU 10. The ECU 10 closes the opening-and-closing valve 43 before driving the fan 42 in switching from the power generation operation to the intermittent operation. Thus, when the fan 42 starts, the opening-and-closing valve 43 closes. This effectively suppresses the backflow of the air discharged from the fan 42. The ECU 10 opens the opening-and-closing valve 43 before driving the air compressor 35 in switching from the intermittent operation to the power generation operation. When the air compressor 35 starts, the opening-and-closing valve 43 opens. This efficiently supplies air to the FC 20.

In a case where the opening-and-closing valve 43 is a valve that opens and closes in accordance with instructions from the ECU 10, the opening-and-closing valve 43 stably opens and closes, as compared to the opening-and-closing valve 43 opening and closing due to the force generated by driving the air compressor 35 and the fan 42 in the first embodiment.

The first to third embodiments exemplify the fan 42 serving as the first discharger, and the air compressor 35 serving as the second discharger. However, other devices may be the first and second dischargers, as long as a discharge pressure of the second discharger is higher than that of the first discharger. For example, the first discharger may be a blower (discharge pressure: 10 kPa or more and lower than 100 kPa) and the second discharger may be a compressor. The first discharger may be a fan, and the second discharger may be a blower. Alternatively, a pair of the first and second dischargers may be fans, blowers, or compressors. However, in light of supplying a large amount of oxidant gas to the FC 20 in the power generation operation of the FC 20, the second discharger may be a compressor. In light of suppressing power consumption in the intermittent operation, the first discharger may be a fan.

In the intermittent operation control, the first to third embodiments exemplify a case where the average cell voltage of the FC 20 is compared with a predetermined voltage. However, the voltage of the FC 20 other than the average cell voltage (for example, the total voltage of the FC 20) may be compared with a predetermined voltage.

Although some embodiments of the present disclosure have been described in detail, the present disclosure is not limited to the specific embodiments but may be varied or changed within the scope of the present disclosure as claimed.

Finally, several aspects of the present disclosure are summarized as follows. According to an aspect of the present disclosure, there is provided a fuel cell system including: a fuel cell stack; a first discharger configured to suck oxidant gas and to discharge the oxidant gas toward the fuel cell stack, and provided within an oxidant gas flow path supplying the oxidant gas to the fuel cell stack; an opening-and-closing valve provided within the oxidant gas flow path, and configured to open and close a partial area of the oxidant gas flow path next to the first discharger, the opening-and-closing valve and the first discharger being arranged side by side in a direction intersecting a flow of the oxidant gas; a second discharger provided at an upstream side or a downstream side of the flow of the oxidant gas with respect to the first discharger and the opening-and-closing valve, and configured to suck the oxidant gas through the oxidant gas flow path and to discharge the oxidant gas toward the fuel cell stack through the oxidant gas flow path, a discharge pressure of the second discharger being higher than a discharger pressure of the first discharger; a voltage detector configured to detect a voltage of the fuel cell stack; and a controller configured to control the first discharger and the second discharger, wherein the controller is configured to drive the second discharger in a state where the opening-and-closing valve opens, in a power generation operation in which required power to the fuel cell stack is higher than a predetermined power and the fuel cell stack generates power, the controller is configured to stop the second discharger when an intermittent operation in which the required power is equal to or lower than the predetermined power is switched from the power generation operation, and to drive the first discharger when the voltage of the fuel cell stack is equal to or lower than a first predetermined voltage in the intermittent operation in a state where the opening-and-closing valve closes.

When the second discharger is driven in a state where the opening-and-closing valve opens in the power generation operation, the oxidant gas sucked and discharged by the second discharger flows through the opening-and-closing valve, which efficiently supplies a large amount of the oxidant corresponding to the required power to the fuel cell stack. The first discharger is driven in a case where the opening-and-closing valve closes in the intermittent operation, which suppresses the backflow of the oxidant gas discharged from the first discharger, and which efficiently supplies the oxidant gas to the fuel cell stack. The first discharger and the opening-and-closing valve are arranged side by side within the oxidizing gas flow path, which suppresses an increase in size of the fuel cell system.

The invention claimed is:

1. A fuel cell system comprising:
a fuel cell stack;
a first discharger configured to suck oxidant gas and to discharge the oxidant gas toward the fuel cell stack, and provided within an oxidant gas flow path supplying the oxidant gas to the fuel cell stack;
an opening-and-closing valve provided within the oxidant gas flow path, and configured to open and close a partial area of the oxidant gas flow path next to the first discharger, the opening-and-closing valve and the first discharger being arranged side by side in a direction intersecting a flow of the oxidant gas;
a second discharger provided at an upstream side or a downstream side of the flow of the oxidant gas with respect to the first discharger and the opening-and-closing valve, and configured to suck the oxidant gas through the oxidant gas flow path and to discharge the oxidant gas toward the fuel cell stack through the oxidant gas flow path, a discharge pressure of the second discharger being higher than a discharger pressure of the first discharger;
a voltage detector configured to detect a voltage of the fuel cell stack; and
a controller configured to control the first discharger and the second discharger,
wherein
the controller is configured to drive the second discharger in a state where the opening-and-closing valve opens, in a power generation operation in which required power to the fuel cell stack is higher than a predetermined power and the fuel cell stack generates power,
the controller is configured to stop the second discharger when an intermittent operation in which the required power is equal to or lower than the predetermined power is switched from the power generation operation, and to drive the first discharger when the voltage of the fuel cell stack is equal to or lower than a first predetermined voltage in the intermittent operation in a state where the opening-and-closing valve closes,
the first discharger includes a first frame, and a rotating body positioned within the first frame and rotating,
the opening-and-closing valve includes a second frame, and a valve body rotatably supported and positioned within the second frame, and
the first frame and the second frame are in contact with an inner wall of the oxidant gas flow path.

2. The fuel cell system according to claim 1, wherein the opening-and-closing valve includes a valve body rotatably supported, opens due to force generated by driving the second discharger and one of sucking and discharging the oxidant gas in the power generation operation, and closes due to force generated by driving the first discharger and sucking and discharging the oxidant gas in the intermittent operation.

3. The fuel cell system according to claim 1, wherein
the opening-and-closing valve opens and closes in accordance with an instruction from the controller, and
the controller is configured to control the opening-and-closing valve to close when the intermittent operation is switched from the power generation operation before the first discharger is driven, and to control the opening-and-closing valve to open when the power generation operation is switched from the intermittent operation before the second discharger is driven.

4. The fuel cell system according to claim 1, wherein the controller is configured to stop the first discharger in the power generation operation.

5. The fuel cell system according to claim 1, wherein the first discharger and the opening-and-closing valve are arranged side by side in a direction orthogonal to the flow of the oxidant gas within the oxidant gas flow path.

6. The fuel cell system according to claim 1, wherein the first frame and the second frame are in contact with each other.

7. The fuel cell system according to claim 1, wherein the controller is configured to close the opening-and-closing valve in the intermittent operation when a state where the voltage of the fuel cell stack is equal to or higher than a second predetermined voltage higher than the first predetermined voltage is shifted from a state where the voltage of the fuel cell stack is lower than the first predetermined voltage.

8. The fuel cell system according to claim 1, wherein
the first discharger is a fan, and
the second discharger is a compressor.

9. A fuel cell system comprising:
a fuel cell stack;
a first discharger configured to suck oxidant gas and to discharge the oxidant gas toward the fuel cell stack, and provided within an oxidant gas flow path supplying the oxidant gas to the fuel cell stack;
an opening-and-closing valve provided within the oxidant gas flow path, and configured to open and close a partial area of the oxidant gas flow path next to the first discharger, the opening-and-closing valve and the first discharger being arranged side by side in a direction intersecting a flow of the oxidant gas;

a second discharger provided at an upstream side or a downstream side of the flow of the oxidant gas with respect to the first discharger and the opening-and-closing valve, and configured to suck the oxidant gas through the oxidant gas flow path and to discharge the oxidant gas toward the fuel cell stack through the oxidant gas flow path, a discharge pressure of the second discharger being higher than a discharger pressure of the first discharger;

a voltage detector configured to detect a voltage of the fuel cell stack; and a controller configured to control the first discharger and the second discharger, wherein the controller is configured to drive the second discharger in a state where the opening-and-closing valve opens, in a power generation operation in which required power to the fuel cell stack is higher than a predetermined power and the fuel cell stack generates power, the controller is configured to stop the second discharger when an intermittent operation in which the required power is equal to or lower than the predetermined power is switched from the power generation operation, and to drive the first discharger when the voltage of the fuel cell stack is equal to or lower than a first predetermined voltage in the intermittent operation in a state where the opening-and-closing valve closes, the oxidant gas flow path includes an air cleaner case including an air element inside, and the first discharger and the opening-and-closing valve are provided within the air cleaner case.

10. The fuel cell system according to claim 9, wherein the first discharger and the opening-and-closing valve are provided within the air cleaner case at a downstream side of the flow of the oxidant gas with respect to the air element.

11. The fuel cell system according to claim 9, wherein the second discharger is provided at a downstream side of the flow of the oxidant gas with respect to the air element.

* * * * *